Dec. 27, 1966

R. C. McKINLAY 3,293,830

FLAME RETARDING INDUCTION SYSTEM FOR AN
INTERNAL COMBUSTION ENGINE
Filed July 14, 1964

R.C. McKINLAY
INVENTOR.

BY John L. Faulkner
Ernest A. Beutler

ATTORNEYS

United States Patent Office 3,293,830
Patented Dec. 27, 1966

3,293,830
FLAME RETARDING INDUCTION SYSTEM FOR AN INTERNAL COMBUSTION ENGINE
Robert C. McKinlay, Dearborn, Mich., assignor to Ford Motor Company, Dearborn, Mich., a corporation of Delaware
Filed July 14, 1964, Ser. No. 382,581
1 Claim. (Cl. 55—276)

This application is a continuation-in-part of my copending application entitled "Air Filter Assembly," S.N. 123,944 filed July 3, 1961, now abandoned, which application is a continuation of my application of the same title, S.N. 713,369, filed February 5, 1958 and now abandoned.

This invention relates to an air induction system for an internal combustion engine embodying a novel air filter assembly.

It is conventional to support an air filter assembly upon the carburetor or other air inlet of an internal combustion engine. The air filter assembly generally comprises some form of replaceable filter cartridge that is supported within a sheet metal air cleaner body assembly. The body assembly includes a tray that is supported by the carburetor and supports, in turn, the filter cartridge. The sheet metal assemblage is provided to route the air through the filter cartridge and into the induction system. Some silencing also may be provided by the body assembly. The various sheet metal members that have been used heretofore to form the body assemblage have added considerable cost to the system. The cost results from the price of the parts per se and the necessity for assembling the air cleaner and attaching it to the engine.

It is, therefore, the principal object of this invention to provide a simplified air filter assembly for an internal combustion engine air induction system.

The air filter cartridge of the induction system is an engine component that requires frequent service. The foreign particles that are separated from the intake air accumulate within the cartridge until they restrict the air flow. If the cartridge is not cleaned or replaced, the reduced air flow causes poor economy and unsatisfactory engine performance.

It is a further object of this invention to provide an air filter assembly wherein the filter cartridge does not require frequent service.

An air induction system for an internal combustion engine embodying this invention includes a flange that defines an air inlet. The intake air is passed through a replaceable air filter cartridge comprising imperforate inner and outer shells that confine an air filtration media. The air filter cartridge is supported upon the flange with the point of support being substantially confined to the area of the inner shell. The inner shell provides an air outlet for the filter cartridge that registers with the air inlet. A cover plate forms a closure for the surface of the air filter cartridge that is remote from the flange. The cover plate directs the air flowing through the filter media to the air inlet through the air outlet provided by the inner shell. The cover plate is supported by the filter cartridge in the area of the outer shell. A fastening means urges the cover plate into engagement with the air filter cartridge and exerts a bending force upon the filter cartridge about its point of support on the flange. The air filter cartridge is sufficiently rigid to resist any substantial deflection under the influence of the bending force exerted by the fastening means for generating a sealing pressure between the air filter cartridge and the flange.

Further objects and advantages of this invention will become more apparent when considered in conjunction with the accompanying drawings, wherein.

Figure 1:
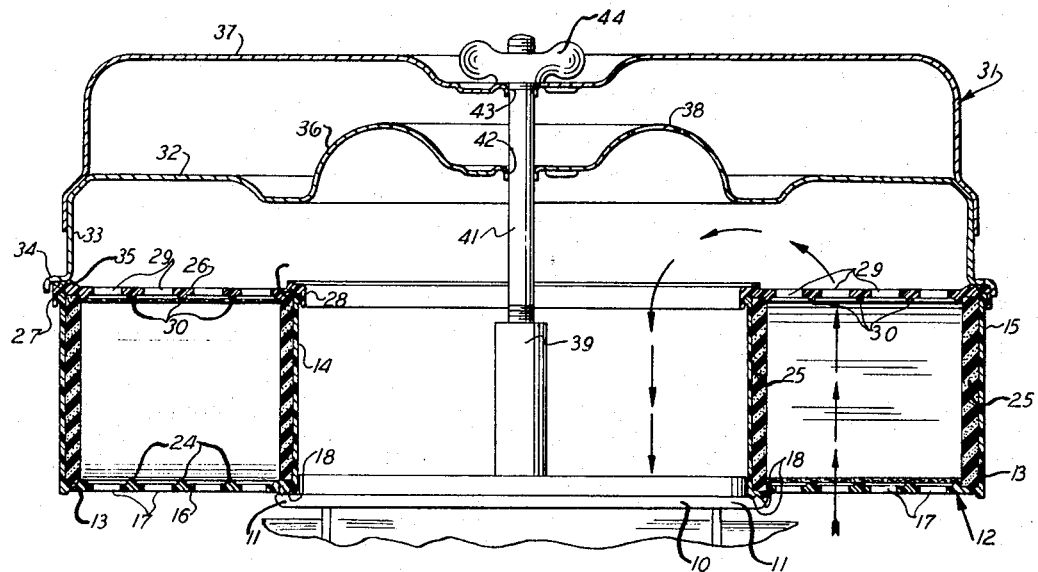
FIGURE 1 is a vertical, cross-sectional view of a portion of an internal combustion engine air induction system embodying this invention.

Referring now in detail to FIGURE 1 of the drawings, a carburetor or other charge forming device of an internal combustion engine, shown in part, is identified by the reference numeral 10. The carburetor 10 has an air inlet that is surrounded by an annular flange 11. A replaceable air filter cartridge, indicated generally by the reference 12, is supported upon the flange 11.

The filter cartridge 12 comprises an annular body shell 13 formed of a flame resistant plastic such as linear polyethylene or polypropylene. The body shell 13 is made up of an imperforate cylindrical inner shell 14 and an imperforate cylindrical outer shell 15 that are positioned coaxially around the air inlet of the carburetor 10. A horizontally extending lower wall 16 is integrally connected to the inner and outer shells 14 and 15. The lower wall 16 has a plurality of air inlet openings 17 positioned around its periphery. A plurality of serrations, indicated by the reference numeral 18, are formed in the lower wall 16 contiguous to the inner shell 14. The serrations 18 engage the flange 11, that terminates a small radial distance outwardly of the inner shell 14, to provide a seal therebetween.

Figure 2:
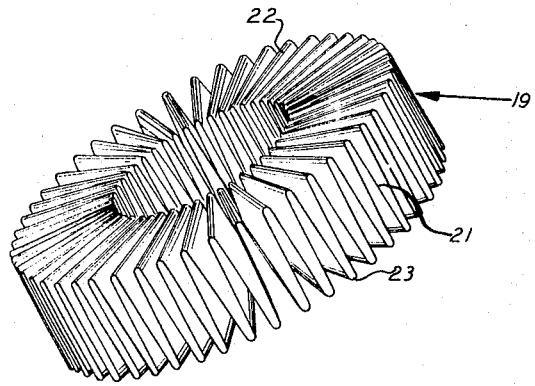
FIGURE 2 is a perspective view of the filter media incorporated within the filter cartridge shown in FIGURE 1.

A pleated paper filter media, indicated generally by the reference numeral 19 and shown in greater detail in FIGURE 2, is supported within the body shell 13. The filter paper may be treated to minimize the adhesion of dirt particles as described in United States Patent 2,720,279. This treatment will aid in the self-cleaning action to be described. The filter media 19 is made up of a plurality of adjacent, generally vertically extending filter surfaces 21 and that are connected by upper pleats 22 and 23 extend in a direction that is substantially radial to the axis of the air inlet of the carburetor 10 and normal to the inner and outer shells 14 and 15. Circumferentially extending ridges 24 in the upper surface of the lower wall 16 engage the lower pleats 23 to hold the pleated paper filter media 19 a slight distance above the lower wall 16. The edges of the filter surfaces 21 and pleats 22 and 23 are bonded to the inner and outer ends 14 and 15 to provide an air seal therewith by a sealing media indicated by the reference numeral 25. The sealing media 25 may be an uncured expansible elastomer such as sponge rubber that is cured by heating when the assembly is being made. The curing causes the elastomer to expand into the edges of the pleats and the filtering surfaces 21.

An upper wall 26 extends across the top of the body shell 13. The upper wall 26 may be formed from the same material as the body shell 13 and has an outer flange 27 that engages the outer shell 15 and an inner flange 28 that engages the inner shell 14. A plurality of air outlet openings 29 are formed in the upper wall 26 to permit air to flow from the filter cartridge 13. A plurality of depending circumferential ribs 30 engage the upper pleats 22 to space the upper wall 26 from the filter media 19.

The air flowing axially upwardly through the pleated paper filter media 19 between the inner and outer shells 14 and 15 is diverted from the filter cartridge 12 radially inwardly to an air outlet provided by inner shell 14. The air then flows into the air inlet of the carburetor 10. The air flow is diverted by the cover plate assembly indicated generally by the reference numeral 31. The cover plate assembly 31 includes an inverted cup-shaped baffle 32 having a cylindrical outer wall 33. A circumferential flange 34 formed at the lower end of the cylindrical wall 33 engages serrations 35 formed around the periphery of the upper wall 26 of the filter cartridge 12 to provide an air seal therebetween. The baffle 32 is formed with an arched flame shield portion 36 having the shape of a segment of a toroid. Any flames that are discharged from the engine induction system into the inner wall 14 will be redirected back into the induction system by the flame shield portion 36 away from the flame liable, pleated paper filter media 19.

A cup-shaped top 37 is secured to the baffle 32 to define an air space therebetween. The air space acts as a resonant chamber that is open to the outlet side of the filter cartridge 12 by a plurality of openings 38 formed in the flame shield portion 36 of the baffle 32.

The air filter assembly including the cover plate assembly 31 is secured to the induction system in the manner now to be described. An air cleaner attaching device, including an upstanding post 39 formed integrally with the carburetor 10 is provided. The post 39 extends co-axially with the cylindrical inner shell 14. A threaded rod 41 is received in an aperture in the upper end of the post 39. The threaded rod 41 extends through apertures 42 and 43 formed in the baffle 32 and top 37, respectively, of the cover plate assembly 31 and terminates adjacent the upper surface of the top 37. A wing nut 44 is threaded onto the rod 41 to exert an axial pressure upon the assembly. The wing nut 44 urges the flange 34 of the cover plate assembly 31 into engagement with the serrations 35 of the air filter cartridge 12. The force exerted upon the outer periphery of the filter cartridge 12 tends to cause it to deflect about its point of support upon the flange 11. The filter cartridge 12 has sufficient rigidity, however, to resist any substantial deflection and the force is transmitted through the filter cartridge 12 to create an axial pressure upon the serrations 18. The axial pressure causes the serrations 18 to seal against the flange 11. The rigidity of the air filter cartridges 12 results from the use of pleated paper. If a less rigid filter media is used, the rigidity may be built into the body shell 13.

It should be readily apparent that the air filter cartridge 12, because of its construction, dispenses with the necessity of a use of a lower tray. The only sheet metal part required is the cover plate assembly 31. When the filter cartridge 13 becomes filled with contaminates it may be replaced and the cover plate assembly 31 reused. Since the filter surfaces 21 of the pleated paper filter media 19 are disposed in a substantially vertical position, the engine vibrations will cause dirt to shake loose from the surfaces 21. The dirt can fall onto the engine without obstructing the flow through the filter cartridge.

It is to be understood that the invention is not limited to the embodiment shown and described, but that various changes and modifications may be made without departing from the spirit and scope of the invention as defined by the appended claim.

What is claimed is:

An air induction system for an internal combustion engine comprising a carburetor having an air inlet surrounded by a flange, a replaceable air filter cartridge comprising a cylindrical imperforate inner shell, a cylindrical imperforate outer shell and an air filtration media confined between said inner and outer shells, said air filter cartridge being positioned with said inner shell around said air inlet and extending in the same direction therewith to provide an air outlet for said air filter cartridge in registry with said air inlet, said air filter cartridge being supported upon said flange, said flange terminating a substantial radial distance inwardly of said outer shell to confine the support of said air filter cartridge to a point contiguous to said inner shell, a cover plate forming a closure for the surface of said air filter cartridge remote from said carburetor to direct the air flowing axially through said filter media in a radial direction toward the air outlet provided by said inner shell, said cover plate comprising a top and a baffle defining a resonant chamber, said baffle including an arched flame shield portion formed adjacent the inner shell and being capable of redirecting flames discharged from the engine induction system back toward the induction system, said arched flame shield portion having openings therein communicating said resonant chamber with said filter cartridge air outlet, said cover plate being supported by said air filter cartridge in the area of said outer shell, an air filter attaching device affixed to said carburetor and extending through said air outlet and terminating adjacent said cover plate, and fastening means engaging said air filter attaching device and said cover plate for urging said cover plate into axial engagement with said air filter cartridge and exerting a bending force upon said air filter cartridge about its point of support upon said flange, said air filter cartridge being sufficiently rigid to resist any substantial deflection under the influence of the bending force exerted by said fastening means for generating a sealing pressure between said air filter cartridge and said flange.

References Cited by the Examiner

UNITED STATES PATENTS

| | | | |
|---|---|---|---|
| 1,946,015 | 2/1934 | Carnahan | 55—385 X |
| 2,064,207 | 12/1936 | Jacobs | 55—276 |
| 2,287,629 | 6/1942 | Mieras | 55—251 |
| 2,720,279 | 10/1955 | James | 55—498 |
| 2,782,933 | 2/1957 | Monsarrat | 55—510 X |
| 2,843,218 | 7/1958 | Kiehaefer | 55—385 |

FOREIGN PATENTS

| | | |
|---|---|---|
| 1,072,357 | 3/1954 | France. |
| 765,011 | 1/1957 | Great Britain. |

ROBERT F. BURNETT, *Primary Examiner.*